Patented Dec. 14, 1937

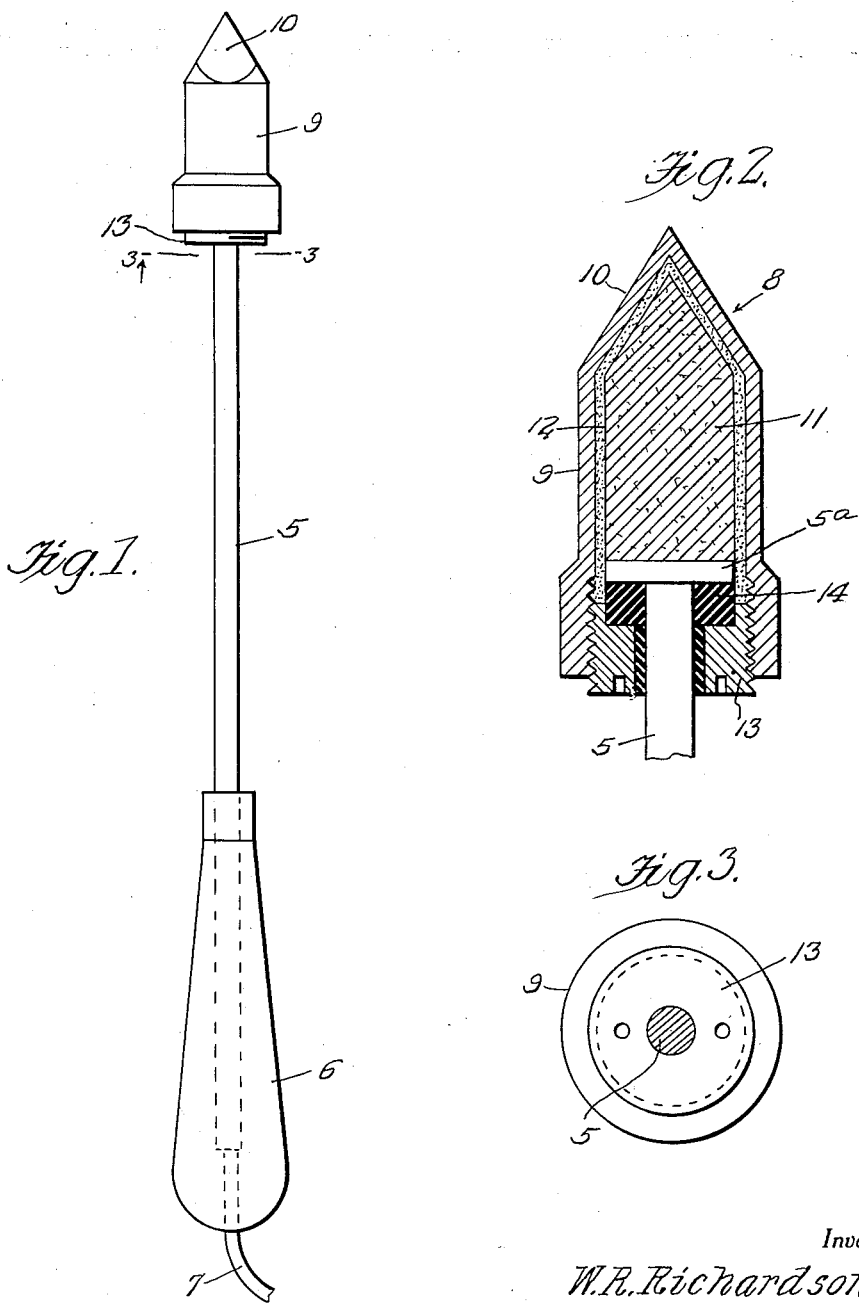

2,102,032

UNITED STATES PATENT OFFICE 2,102,032

SOLDERING IRON

William R. Richardson, Roswell, N. Mex.

Application January 13, 1936, Serial No. 58,959
Renewed October 7, 1937

2 Claims. (Cl. 219—26)

This invention relates to soldering irons and an object of the present invention is to provide a soldering iron which can be substantially instantly heated.

More particularly the invention is concerned with an improved head for the iron to the end that electricity may be utilized for obtaining a quick heating of the head.

Further the invention comprehends the provision of a head for a soldering iron involving an arrangement of and an assembly of solid carbon core and powdered or ground carbon which will tend to a quick heating of the head.

The invention together with its objects and advantages will be best understood from a study of the following description taken in connection with the accompanying drawing wherein:

Figure 1 is an elevational view of the improved soldering iron.

Figure 2 is a sectional view through the head of the iron and

Figure 3 is a view taken substantially on the line 3—3 of Figure 1.

Referring to the drawing by reference numerals it will be seen that the improved soldering iron comprises a rod 5 of conductive material equipped at one end with a handle 6 of insulating material and which at said end is adapted to be connected in any suitable manner, and preferably within the handle 6 with a conductor wire 7 which may be equipped with a clip or other instrumentality, not shown, whereby said wire may be electrically connected with a battery or other source of electrical current.

On the end of the rod 5 remote from the handle 6 is a head structure indicated generally by the reference numeral 8.

Head 8 comprises a shell 9 which is preferably formed from copper, but other suitable material may be used if desired. The shell 9 is substantially cylindrical being provided at its closed end with a substantially conical or operating point 10.

Housed within the shell 9 is a core 11 of solid carbon, the core 11 being of a shape conforming substantially to the shape of the shell 9, that is the core 11 comprises a substantially cylindrical body having a conical or substantially conical end as shown. At its base the core 11 abuts an enlarged head 5a provided on the adjacent end of the rod 5.

Confined within the shell 9 between the shell and core 11 is powdered or ground carbon 12, and the carbon core 11 as well as the ground carbon 12 are confined within the shell 8 through the medium of a plug 13 that threads into the open end of the shell as clearly shown in Figure 2. At its inner end the plug 13 is recessed to accommodate a washer 14 interposed between the plug and the head 5a of the rod 5. Washer 14 is of heat resisting insulating material of whatever kind or character desired.

As is thought to be apparent, in actual practice, an electric current is induced by connecting the wire 7, electrically, with a source of electrical current, and when grounding the soldering iron proper, the current will flow through the rod 5, core 11 and powdered carbon 12 in a manner to quickly and efficiently heat the shell 9.

It will be appreciated that as the ground or powdered carbon is expended, plug 13 will be caused to expand sufficiently to maintain good contact. Eventually of course the ground or powdered carbon 12 is burned up and completely expended, and when this occurs the shell 12 may be easily recharged or refilled. To effect this refilling plug 13 is removed and the carbon core 11 withdrawn from the shell. The desired amount of ground or powdered carbon is then placed within the shell after which the parts are reassembled. This recharging or refilling of the carbon head can be quickly effected.

The use of powdered or ground carbon has been found very desirable and such tends to insure complete contact in the entirety of the shell and lends to instantaneous heating of the soldering iron.

While I have herein illustrated and described a preferred embodiment of the invention it will be understood that certain changes may be made therein provided the same fall within the scope of the claims hereunto appended.

Having thus described the invention, what is claimed as new is:

1. An electric soldering iron comprising a rod of conductive material having an electrical connection with a source of current, a handle on one end of said rod, said rod being provided with a lateral head on the end thereof remote from said handle, a shell receiving the head equipped end of said rod, a solid carbon core arranged in the shell and having an end bearing against said head, ground carbon arranged within said shell about said solid carbon core, and an apertured plug disposed about said rod and threaded into one end of said shell for closing the latter and for securing the shell on the head equipped end of said rod.

2. An electric soldering iron comprising a rod of conductive material having an electrical connection with a source of current, a handle on one end of said rod, said rod being provided with a lateral head on the end thereof remote from said handle, a shell receiving the head equipped end of said rod, a solid carbon core arranged in the shell and having an end bearing against said head, ground carbon arranged within said shell about said solid carbon core, and an apertured plug disposed about said rod and threaded into one end of said shell for closing the latter and for securing the shell on the head equipped end of said rod, and a washer of insulating material disposed about the head equipped end of said rod and interposed between said head and said plug

WILLIAM R. RICHARDSON.